(12) United States Patent
Yakita

(10) Patent No.: US 7,236,305 B2
(45) Date of Patent: Jun. 26, 2007

(54) ZOOM LENS AND IMAGE PICKUP APPARATUS HAVING THE SAME

(75) Inventor: Shinichiro Yakita, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/470,111

(22) Filed: Sep. 5, 2006

(65) Prior Publication Data

US 2007/0058264 A1    Mar. 15, 2007

(30) Foreign Application Priority Data

Sep. 12, 2005    (JP)    ............................. 2005-263888

(51) Int. Cl.
G02B 15/02    (2006.01)
(52) U.S. Cl. ....................... 359/675; 359/674
(58) Field of Classification Search ................ 359/672, 359/673, 674, 675
See application file for complete search history.

(56) References Cited

U.S. PATENT DOCUMENTS

| | | | | |
|---|---|---|---|---|
| 4,146,305 A | * | 3/1979 | Tanaka | ......................... 359/674 |
| 4,157,211 A | * | 6/1979 | Tanaka et al. | .............. 359/674 |
| 5,097,360 A | * | 3/1992 | Fukami et al. | ............... 359/674 |
| 6,307,683 B1 | * | 10/2001 | Miyano | ....................... 359/675 |
| 7,057,827 B2 | * | 6/2006 | Wakazono | ................... 359/684 |

FOREIGN PATENT DOCUMENTS

| | | |
|---|---|---|
| JP | 9-274129 | 10/1997 |
| JP | 11-211980 | 8/1999 |
| JP | 2003-270517 | 9/2003 |
| JP | 2004-85676 | 3/2004 |
| JP | 2005-181419 | 7/2005 |

\* cited by examiner

*Primary Examiner*—Scott J. Sugarman
(74) *Attorney, Agent, or Firm*—Fitzpatrick, Cella, Harper & Scinto

(57) ABSTRACT

A zoom lens in which a precise focus detection signal can be detected while a user can observe an image to be shoot without being affected by insertion/removal of an extender lens into an optical axis. A relay lens unit stationary during zooming includes lens unit L21 including a branch element, lens unit L22 interchangeable with extender lens unit insertable into/removable from optical path to change focal length range of the entire system and positive lens unit L23 in order from object side to image side, and the zoom lens satisfies specific conditions among distance from an aperture stop to front principal point of L21, distance from rear principal point of L21 to front principal point of L22, distance from rear principal point of L22 to front principal point of L23, refractive power of L21, and refractive power of the entire system of the zoom lens at wide-angle end.

7 Claims, 10 Drawing Sheets

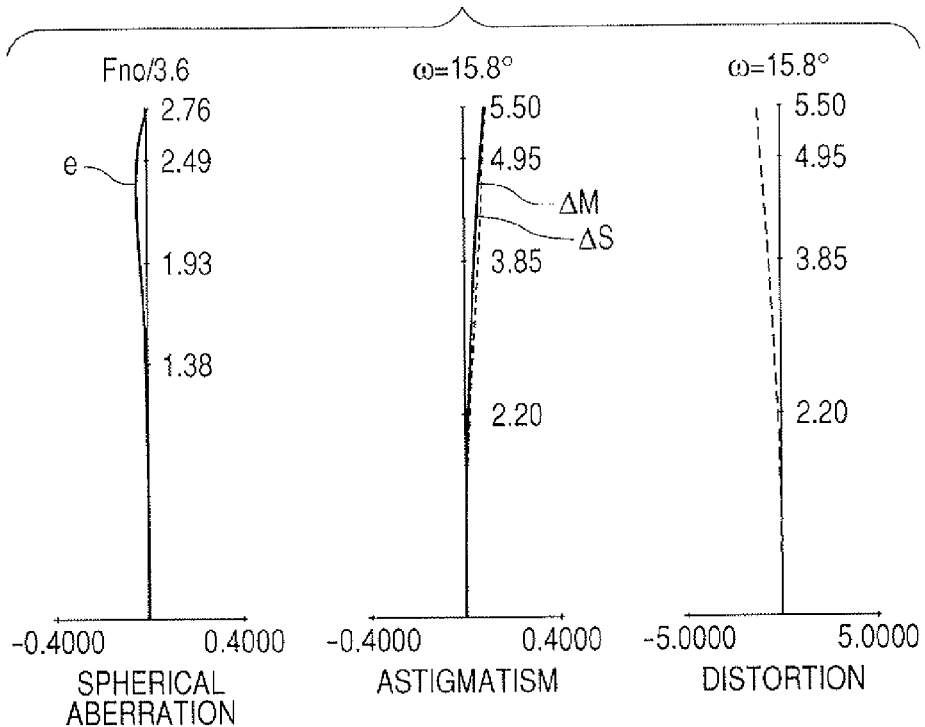
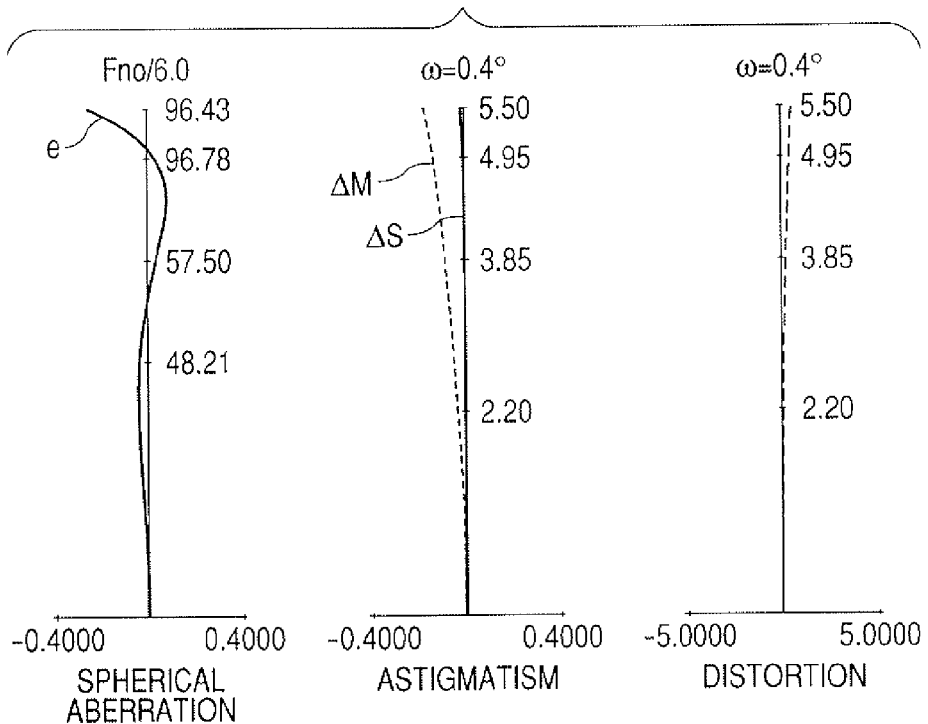

ZOOM LENS AND IMAGE PICKUP APPARATUS HAVING THE SAME

BACKGROUND OF THE INVENTION

1. Field of the Invention

The present invention relates to a zoom lens suitable for an image pickup apparatus of a broadcast TV camera or a video camera.

2. Description of the Related Art

In recent years, the broadcast TV camera has been shifting to HDTV (high definition television), and image pickup systems that can realize higher definition images are demanded.

To meet the demand, image pickup elements with a higher definition and zoom lenses used as an image pickup optical system with improved performance (improved resolving power) have been developed.

An increase in the resolving power of the image pickup optical system enables resolution of high frequency components of objects.

However, this leads to a decrease in the focal depth of the image pickup optical system, and fine focus adjustment is required near the best focus position (or the best image plane).

In the case of manual focusing, a photographer performs focusing while viewing a relatively small image screen such as a view finder.

Therefore, highly accurate focusing has become difficult.

Under the above described circumstances, demands for zoom lenses having an auto focusing function (auto focus detection function) have been increasing.

Auto focusing systems include active auto focusing systems and passive auto focusing systems.

In the active auto focusing system, a separate ranging system is provided in addition to an image pickup optical system, and the distance of an object is measured by for example emitting infrared light from the ranging system toward the object and receiving the infrared light reflected by the object.

This positive auto focus system is not suitable for use in an image pickup apparatus of a TV camera, since operability and mobility are required to be ensured in the image pickup apparatus for a TV camera.

On the other hand, there is a type of passive auto focusing system in which a part of the lens units of the image pickup optical system or the image pickup element is driven along the optical axis direction by a small amplitude (i.e. wobbled) to obtain a signal for determining the direction of the best focus position (which system is sometimes referred to as a "a contrast detecting focus system")

In this system, a part of the lens units of the image pickup system is moved minutely, which causes the problem that the movement of seeking the best focus position is reflected unsightly in the picked up image.

In another passive auto focus system, a part of light beams traveling in the optical path of an image pickup optical system for guiding light from an object to an image pickup element for picking up an image is branched, and the branched light beams are focused onto an image pickup element for focus detection to obtain a focusing signal.

Various such systems in which the focusing state is determined by a branching optical system (focusing optical system) different from the image pickup optical system have been known (see Japanese Patent Application Laid-Open No. H09-274129, Japanese Patent Application Laid-Open No. 2004-085676 and Japanese Patent Application Laid-Open No. 2003-270517).

These systems in which a branching optical system is provided in addition to the image pickup optical system have the advantage that it is possible to obtain a focusing signal while presenting clearer images without deteriorating the quality of picked up images.

The system in which a branching element for branching a part of beams is provided in the optical path of an image pickup optical system and the direction toward the best focus position is determined using a branching optical system different from the image pickup optical system has the advantage that the operation of seeking the focus position is not reflected in the picked up image.

However, the presence of the branching optical system added in the periphery of the image pickup optical system leads to an increase in the total length of the lens.

In addition, this also leads to an increase in the effective diameter of the lens, and the position of the exit pupil becomes close to the focus position, which causes the disadvantage that color shading occurs in the case of three-image-pickup-element TV cameras having a color splitting optical system.

In some zoom lenses for a TV camera, a part of the lens units in a relay optical system is inserted into/removed from the optical path in exchange for another lens unit (i.e. an extender lens) to change the focal length range of the entire system.

In that case, in detecting a best focus position signal by a light receiving element in the branching optical system, in the case where a light beam passing through the extender lens is incident on the branching optical system, the imaging magnification on the light receiving element changes.

In that case, the F number of the entire system changes depending on the insertion/removal of the extender lens, and the focal depth also changes therewith. Therefore, a high focus detection accuracy cannot be attained.

It is very important for image pickup optical systems (zoom lenses) for TV cameras or the like in recent years to satisfy requirements for down sizing and weight reduction of the image pickup optical systems, elongation of the exit pupil distance and excellent optical performance.

An object of the present invention is to provide a zoom lens that allows viewing of picked up images without being affected by insertion/removal of an extender lens into/from the optical path and at the same time enables highly accurate detection of a focus detection signal.

SUMMARY OF THE INVENTION

According to one aspect of the invention, a zoom lens comprises the following elements arranged in the mentioned order from the object side to the image side: a focusing lens unit; a variator lens unit that moves along an optical axis during zooming; a compensator lens unit that moves along the optical axis to compensate image plane variation during zooming; an aperture stop for regulating light quantity; and a relay lens unit that is kept stationary during zooming, the relay lens unit including a lens unit L21 including a branch element, a lens unit L22 that is interchanged with an extender lens unit L22ex that can be inserted into/removed from the optical path to change the focal length range of the entire lens system and a lens unit L23 having a positive refractive power, arranged in the mentioned order from the object side to the image side, the zoom lens satisfying the following conditions:

$$\left|\frac{e_{22}}{e_{20}+e_{21}}\right| < 1.5$$

$$\left|\frac{\phi_{21}}{\phi_w}\right| < 0.6$$

where, $e_{20}$ represents the distance from said aperture stop to the position of the front side principal point of the lens unit L21, $e_{21}$ represents the distance from the position of the rear side principal point of the lens unit L21 to the position of the front side principal point of the lens unit L22, $e_{22}$ represents the distance from the position of the rear side principal point of the lens unit L22 to the position of the front side principal point of the lens unit L23, $\Phi_{21}$ represents the refractive power of the lens unit L21, and $\Phi_W$ represents the refractive power of the entire system of the zoom lens at the wide-angle end.

According to a further aspect of the invention, in the zoom lens the following conditions are satisfied:

$$\left|\frac{e_{22}}{e_{20}+e_{21}}\right| < 1.0 \quad (1a)$$

$$\left|\frac{\phi_{21}}{\phi_w}\right| < 0.4. \quad (2a)$$

According to a further aspect of the present invention, in the zoom lens, said lens unit L21 includes an anti-vibration lens unit IS that is movable in a plane perpendicular to the optical axis.

According to a further aspect of the invention, in the zoom lens, a lens unit that constitutes said lens unit L23 has at least one of macro shooting function and a flange back adjusting function.

According to a further aspect of the present invention, in the zoom lens, the following condition is satisfied:

0.07<|$\Phi_{IS}$/$\Phi_W$|<0.22 where $\Phi_{IS}$ is the refractive power of the anti-vibration lens unit IS and $\Phi_W$ is the refractive power of the entire system of the zoom lens at the wide-angle end.

According to another aspect of the invention, an image pickup apparatus comprises a zoom lens set out in the forgoing and a solid state image pickup element that receives an image formed by the zoom lens.

According to the present invention, a branch element for branching light beams into a branching optical system is arranged in the object side of a lens unit (or extender lens unit) that can be inserted into/removed from the optical axis to change the focal length range of the entire system. By this feature, it is possible to detect the best focus position (or the optimum focusing position) using the branching optical system without deteriorating image quality.

Further features of the present invention will become apparent from the following description of exemplary embodiments (with reference to the attached drawings).

BRIEF DESCRIPTION OF THE DRAWINGS

FIGS. 3A and 3B are aberration diagrams of the zoom lens according to the first embodiment in the state in which an extender Ex is inserted.

DESCRIPTION OF THE EMBODIMENTS

In the following, embodiments of the zoom lens and the image pickup apparatus having the same according to the present invention will be described.

Figure 1:
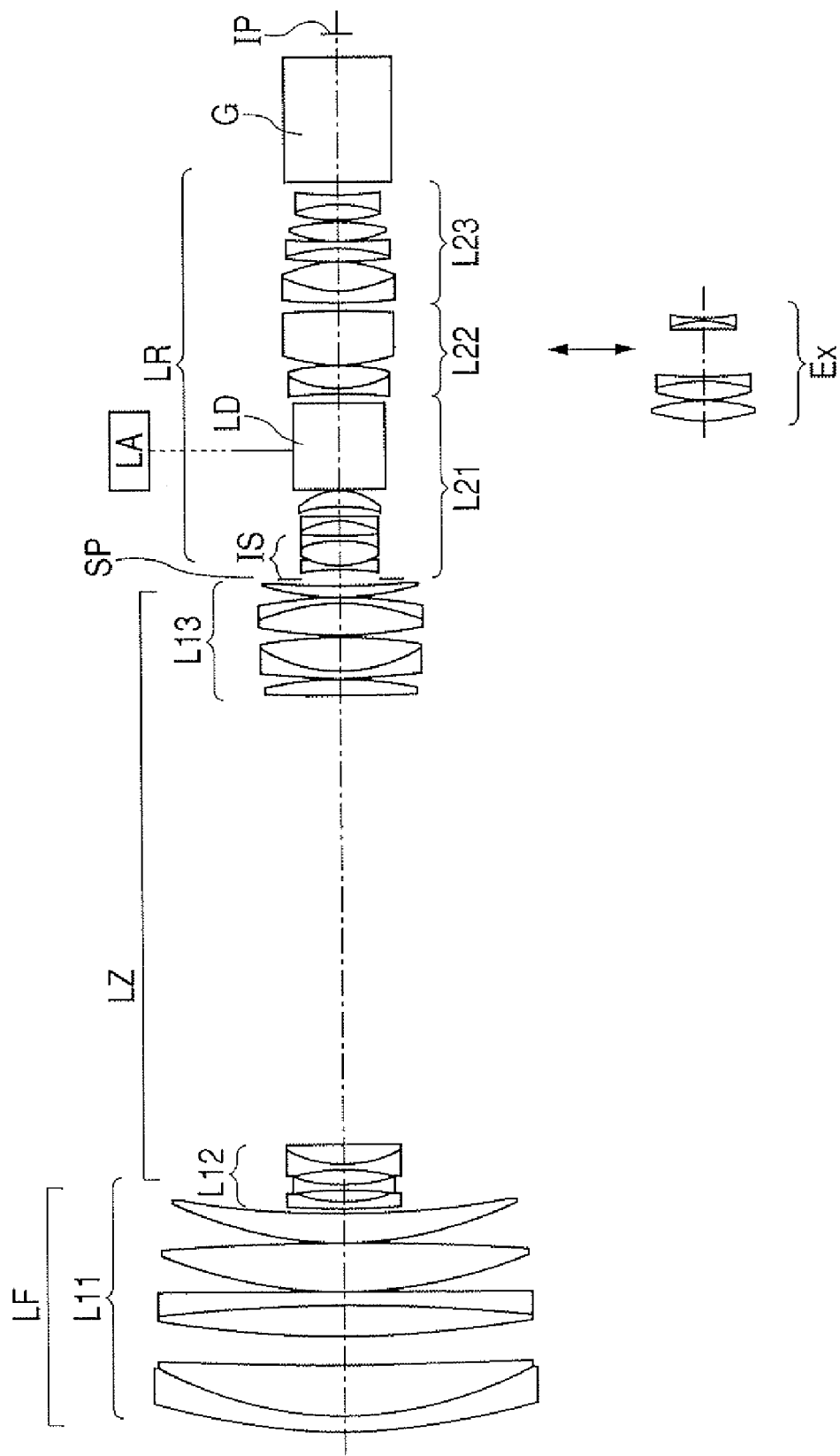
FIG. 1 is a cross sectional view of a zoom lens according to a first embodiment.

FIG. 1 is a cross sectional view of a zoom lens according to a first embodiment of the present invention at the wide-angle end (i.e. in a short focal length state).

Figure 2A:
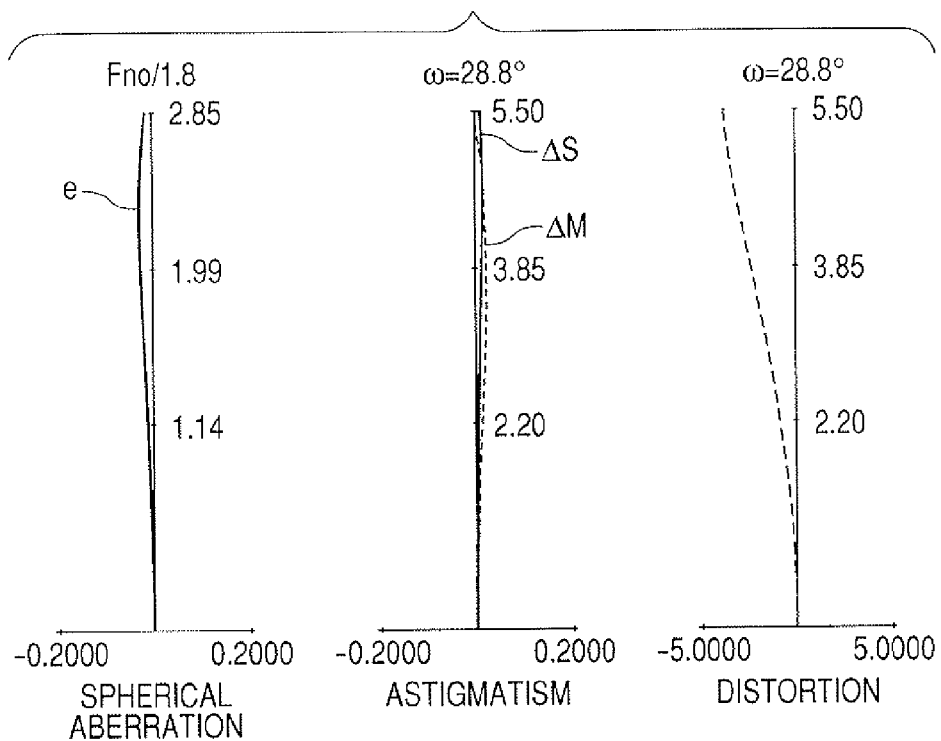
FIGS. 2A and 2B are aberration diagrams of the zoom lens according to the first embodiment at the wide-angle end and the telephoto end respectively.
Figure 2B:
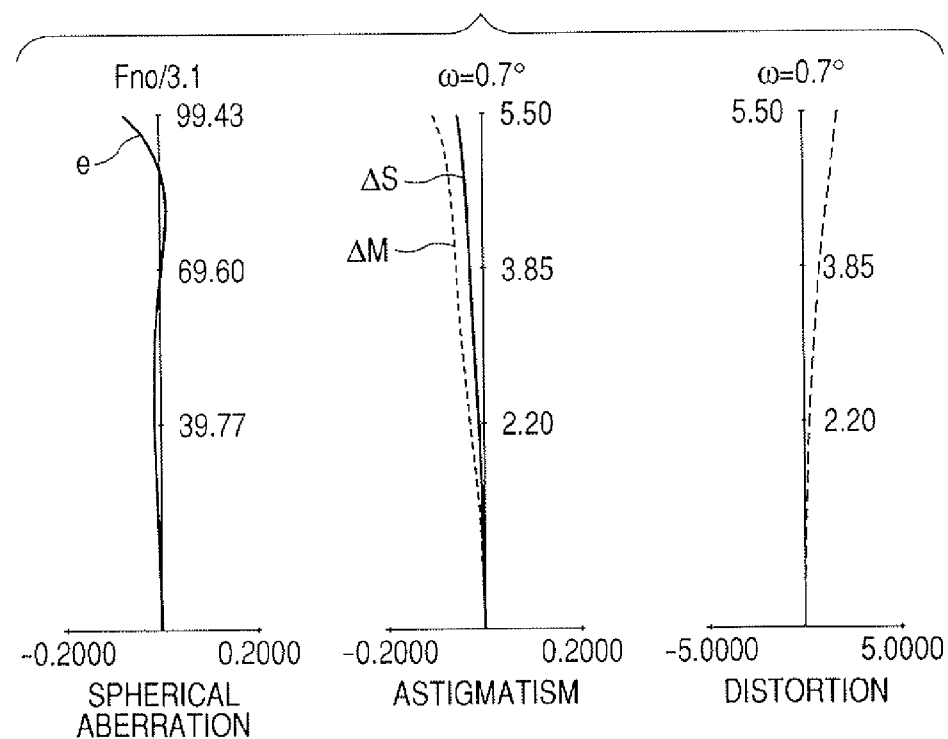

FIGS. 2A and 2B are aberration diagrams of the zoom lens according to the first embodiment at the wide-angle end and at the telephoto end (i.e. in a long focal length state) respectively.

FIGS. 3A and 3B are aberration diagrams of the zoom lens according to the first embodiment in the state in which an extender lens is inserted, at the wide-angle end and at the telephoto end respectively.

Figure 4:
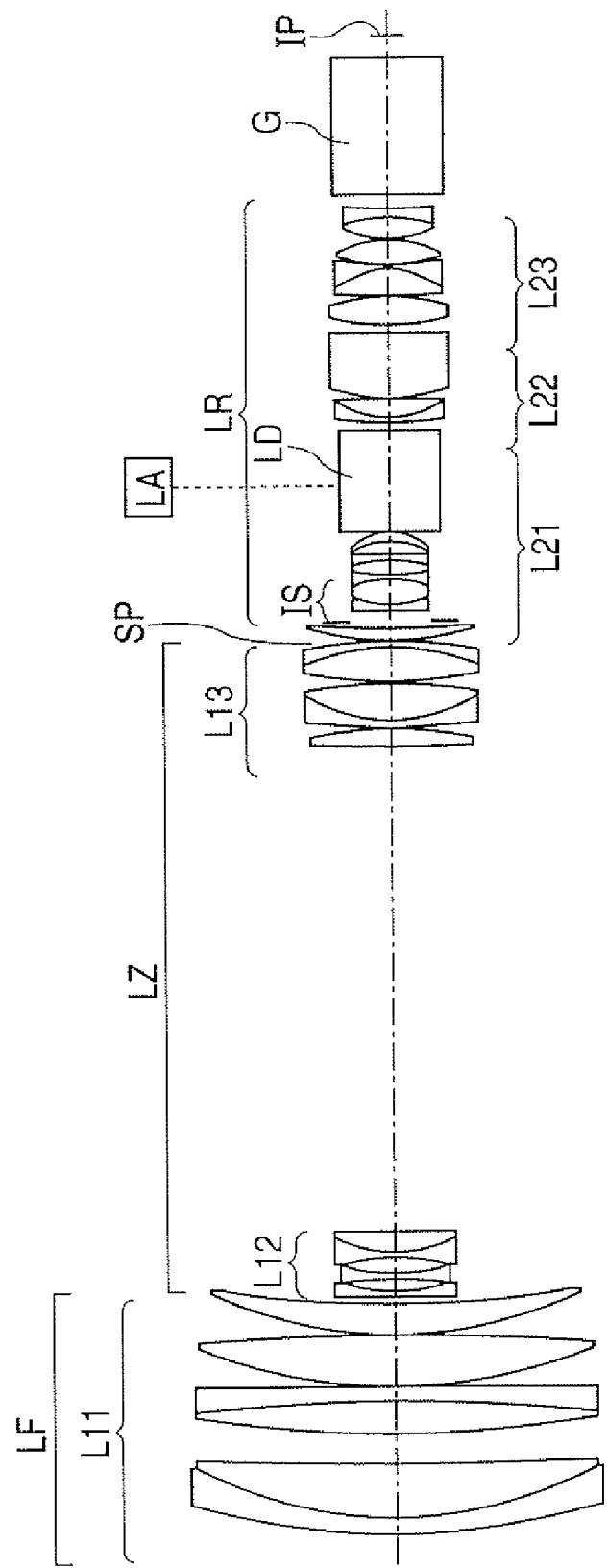
FIG. 4 is a cross sectional view of a zoom lens according to a second embodiment.

FIG. 4 is a cross sectional view of a zoom lens according to a second embodiment of the present invention at the wide angle end.

Figure 5A:
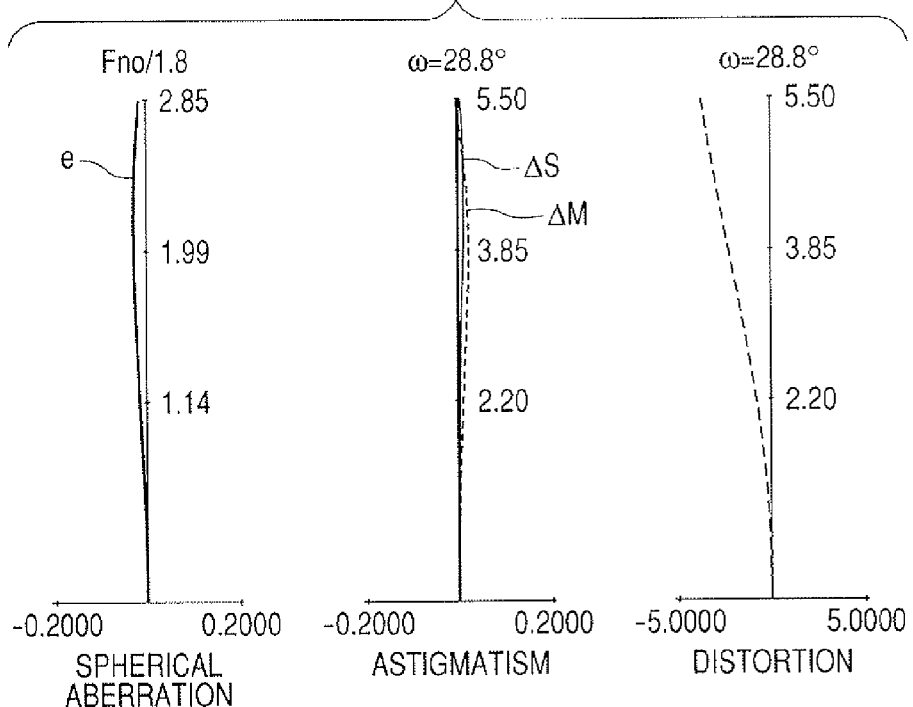
FIGS. 5A and 5B are aberration diagrams of the zoom lens according to the second embodiment at the wide-angle end and the telephoto end respectively.
Figure 5B:
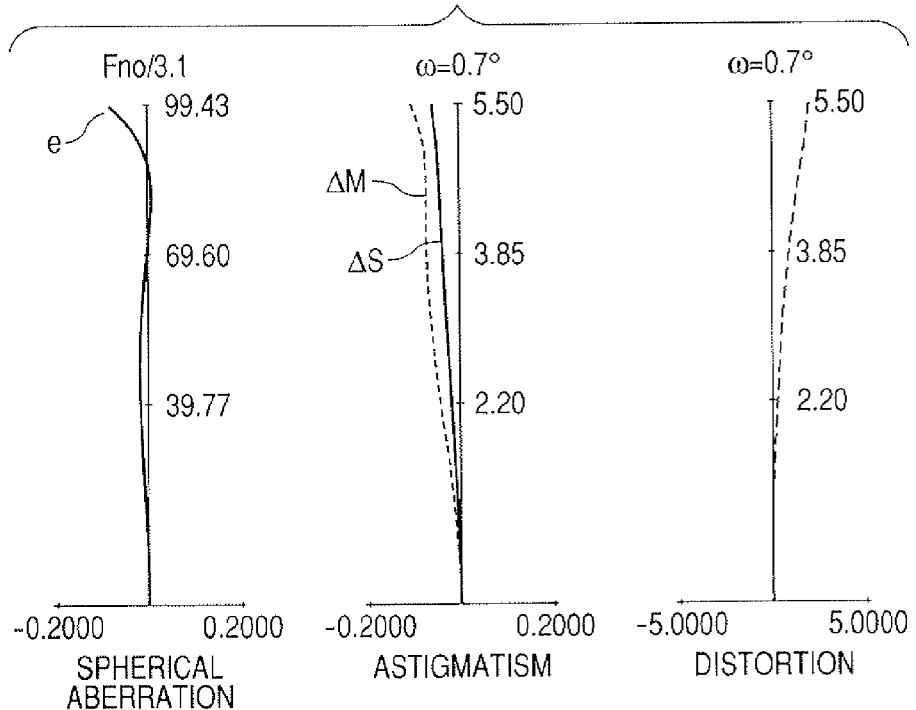

FIGS. 5A and 5B are aberration diagrams of the zoom lens according to the second embodiment at the wide-angle end and at the telephoto end respectively.

Figure 6:
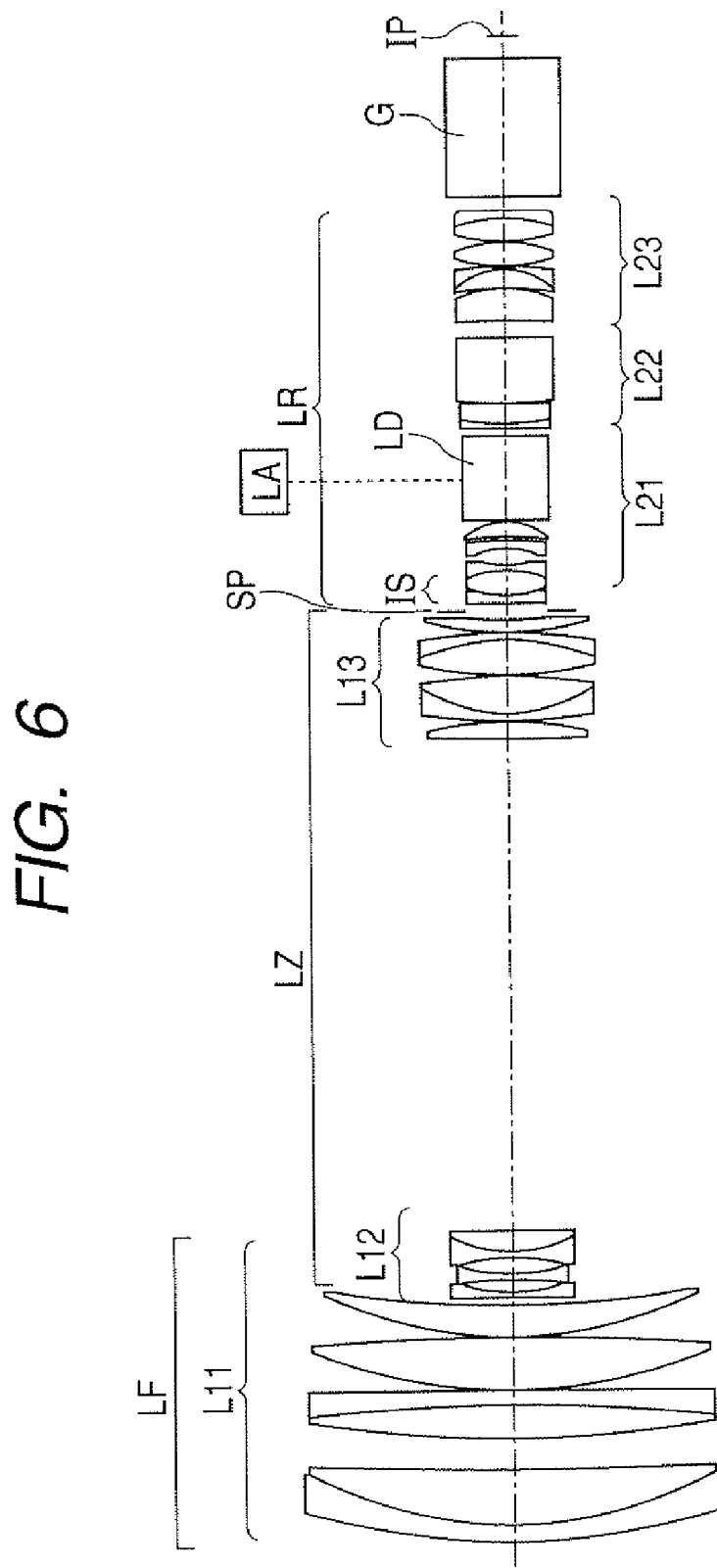
FIG. 6 is a cross sectional view of a zoom lens according to a third embodiment.

FIG. 6 is a cross sectional view of a zoom lens according to a third embodiment of the present invention at the wide-angle end.

Figure 7A:
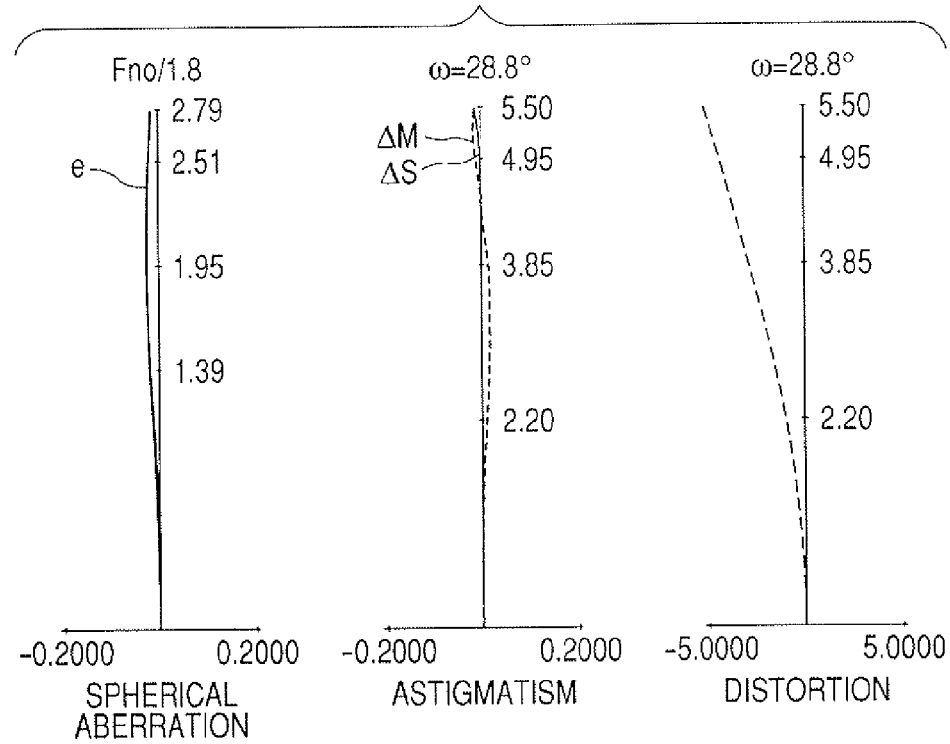
FIGS. 7A and 7B are aberration diagrams of the zoom lens according to the third embodiment at the wide-angle end and the telephoto end respectively.
Figure 7B:
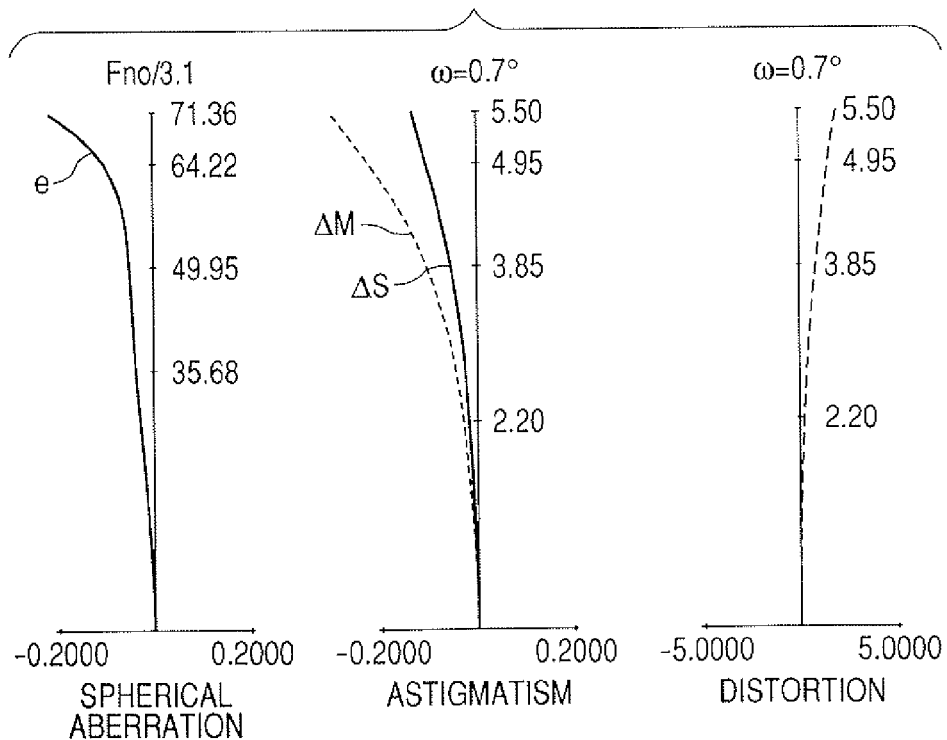

FIGS. 7A and 7B are aberration diagrams of the zoom lens according to the third embodiment at the wide-angle end and at the telephoto end respectively.

Figure 8:
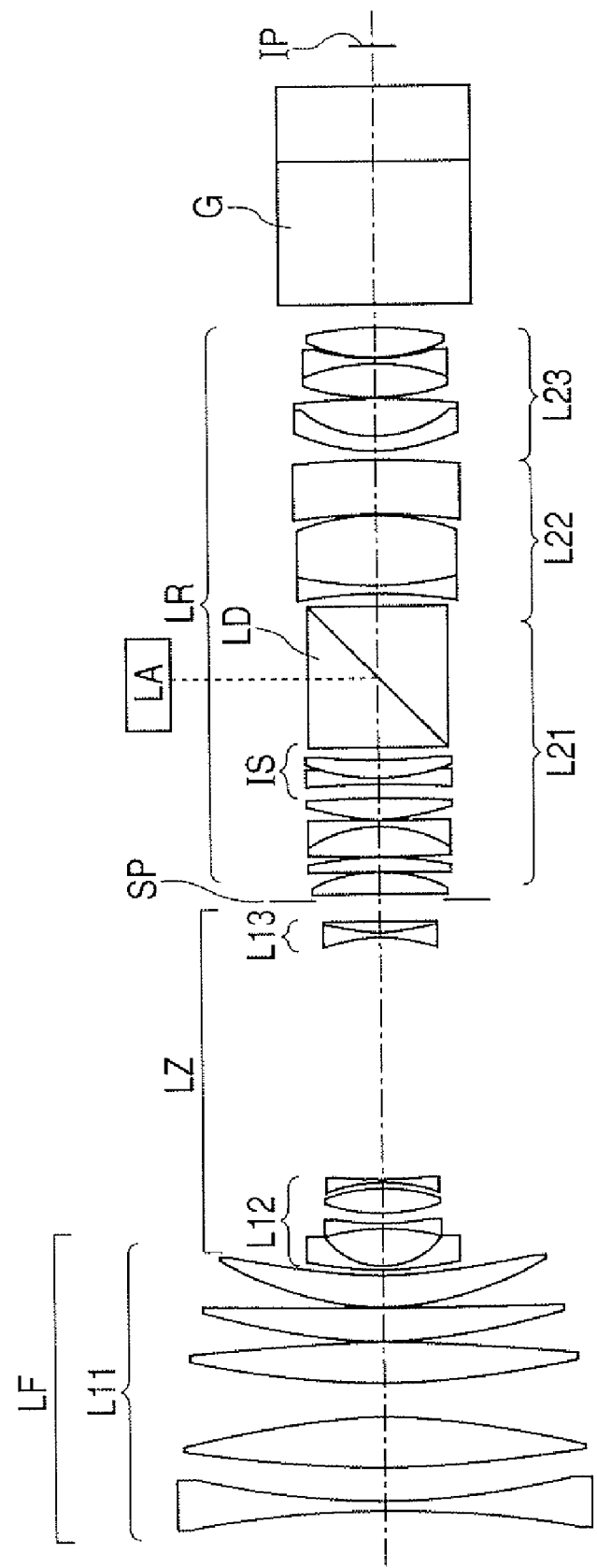
FIG. 8 is a cross sectional view of a zoom lens according to a fourth embodiment.

FIG. 8 is a cross sectional view of a zoom lens according to a fourth embodiment of the present invention at the wide-angle end.

Figure 9A:
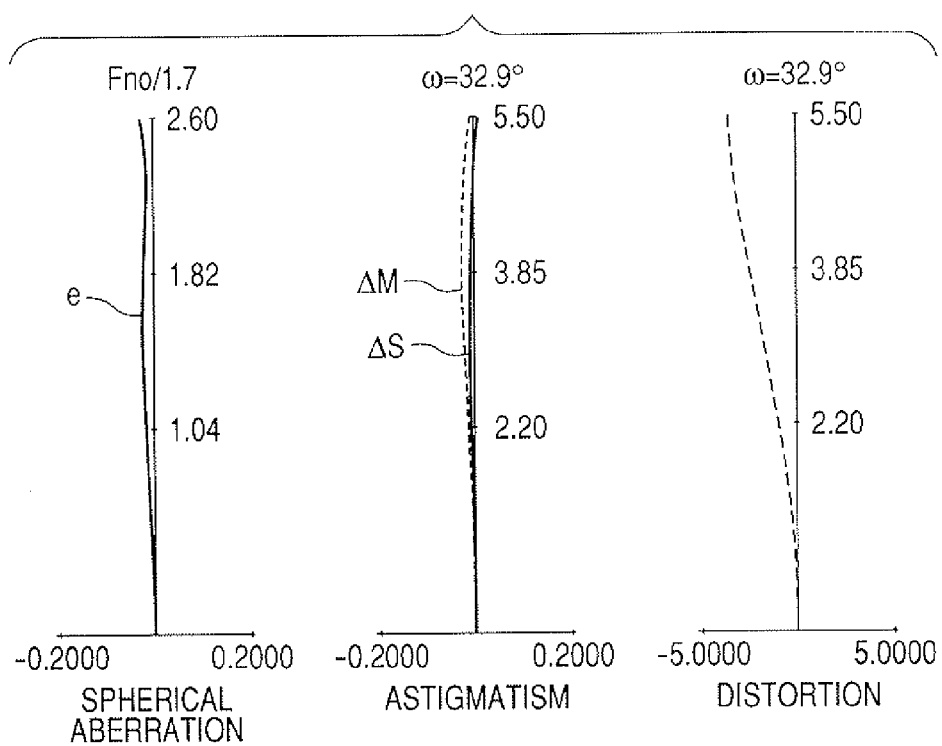
FIGS. 9A and 9B are aberration diagrams of the zoom lens according to the fourth embodiment at the wide-angle end and the telephoto end respectively.
Figure 9B:
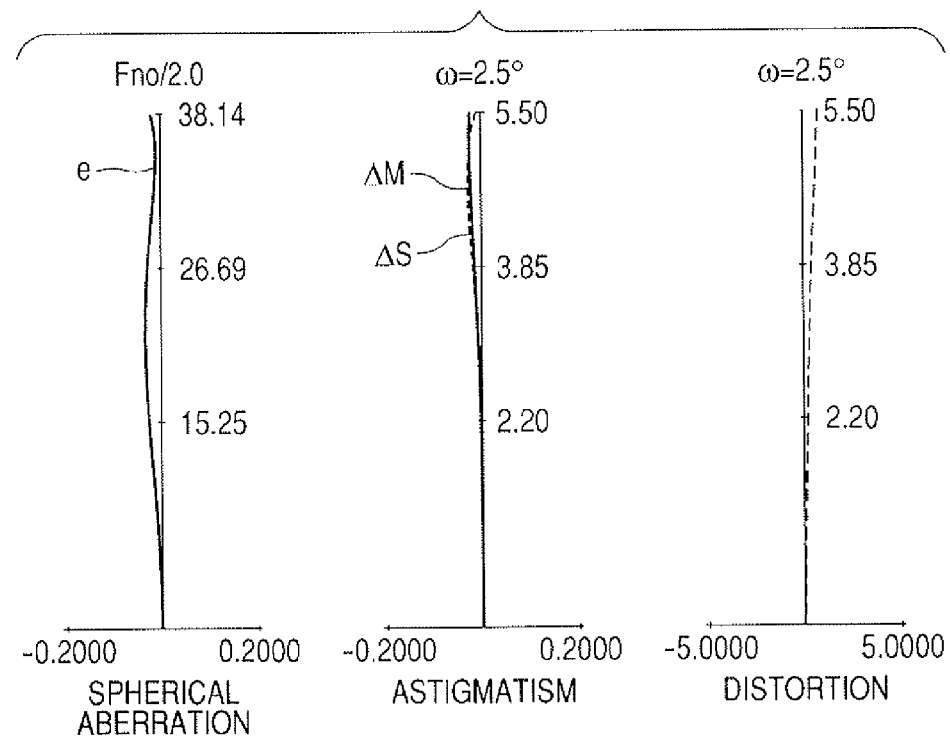

FIGS. 9A and 9B are aberration diagrams of the zoom lens according to the fourth embodiment at the wide-angle end and at the telephoto end respectively.

Figure 10:
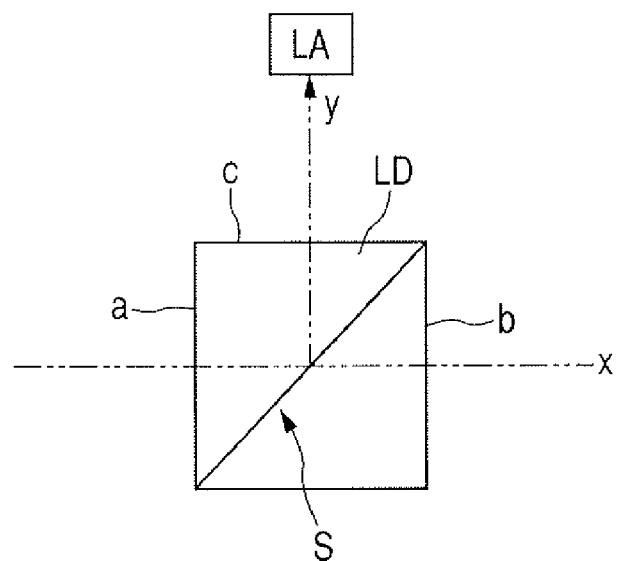
FIG. 10 illustrates a branch element according to the present invention.

FIG. 10 is a diagram illustrating a branch element for branching light beams according to the present invention.

Figure 11:
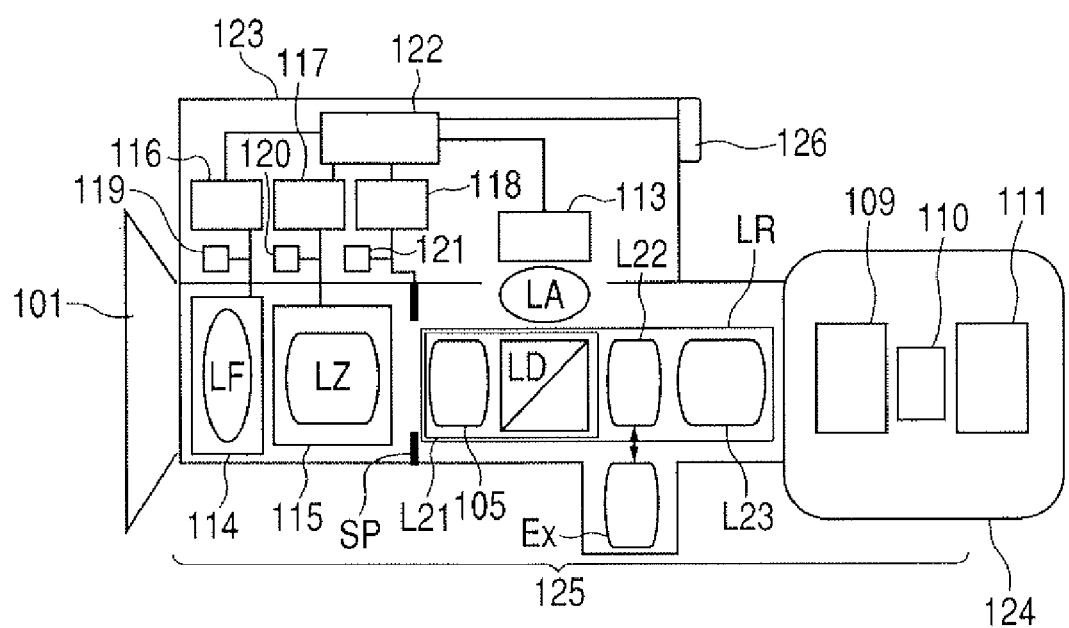
FIG. 11 is a diagram schematically showing the relevant portion of an image pickup apparatus according to the present invention.

FIG. 11 is a schematic diagram of the image pickup apparatus equipped with a zoom lens according to the present invention.

The zoom lenses according to the embodiments are image taking lens systems to be used in an image pickup apparatus for television broadcasting. In the cross sectional view of the lenses, the left side is the object side (i.e. front side) and the right side is the image side (i.e. rear side).

Each of the zoom lenses according to the embodiments of the present invention has the following elements arrange in the following order from the object side to the image side; a focusing portion LF including a focusing lens unit L11, a zoom portion LZ including two lens units (i.e. a variator lens unit L12 and a compensator lens unit L13) that move along the optical axis during zooming, an aperture stop SP that regulates the quantity of light passing through it and an imaging portion LR including a plurality of lens units for imaging, which are relay lens units that are kept stationary during zooming.

The imaging portion LR includes lens units L21, L22 and L23. The lens unit L21 includes a branch element LD that branches or splits incident light beams into a plurality of optical paths.

What is designated by reference sign LA is a branching optical system. The branching optical system LA is used for obtaining a focus detection signal of the photographing optical system (zoom lens) based on a known method by using a part of the photographing light beams branched by the branch element LD.

For example, the auto focus detection apparatus used in the embodiments is a system utilizing a phase difference method.

This system has secondary imaging lenses that form a plurality of images of an object respectively utilizing light beams emitted from a plurality of regions in the exit pupil of the zoom lens and light receiving portions arranged respectively at positions at which the plurality of object images are formed.

The light quantity distributions of the object images are converted into electric signals by the light receiving portions, and focus information of the zoom lens is obtained by computation means based on relative positional relationship of the plurality of object images using the aforementioned electric signals.

Lens unit L21 includes an anti-vibration lens unit IS. All or a part of the anti-vibration lens unit is moved in such a way as to have a movement component perpendicular to the optical axis (decentered by translational or rotational movement).

The anti-vibration lens unit IS is arranged in the object side of the branch element LD for branching a part of the light beams for photographing.

Thus, a vibration-proof, stabilized signal is obtained by the focus detection means for detecting the best focus position that is disposed in a path after the branching, so that the best focus position is detected more accurately.

The lens unit L22 is inserted into/removed from the optical path in exchange for another lens unit (i.e. an extender lens unit) Ex to change the focal length of the entire system.

The extender lens unit Ex is used also in the embodiments other than the embodiment shown in FIG. 1.

When the extender lens unit Ex for changing the focal length range of the entire system is inserted in the photographing optical system, the focal length of the entire system is doubled.

The lens unit L23 has a positive refractive power. All or a part of the lens units in the lens unit L23 has a macro shooting function and/or a flange back adjusting function.

What is designated by reference sign G is an optical block including a color splitting prism, an optical filter, a face plate, a crystal low pass filter and an infrared cut filter.

Reference sign IP designates the image plane which corresponds, in the case where the zoom lens is used as the image taking optical system of a television camera, video camera or digital still camera, to the image pickup surface of a solid state image pickup element (photo electric transducer) such as a CCD sensor or a CMOS sensor.

In the aberration diagrams, the left diagram shows spherical aberration, the center diagram shows field curvature and astigmatism, and the right diagram shows distortion. Sign e represents the e-line, and signs $\Delta M$ and $\Delta S$ represents the meridional image plane and the sagittal image plane for the e-line. Sign Fno represents the F-number and sign $\omega$ represents the half field angle.

In each embodiment, the branch element LD is disposed in the object side of the extender lens unit L22 (Ex).

In each embodiment, insertion/removal of lens unit L22 into/from the optical path does not cause a change in the field angle of the light beams introduced into the branching optical system LA.

From this follows that when the focus state is determined by the branching optical system LA (i.e. when focus detection is performed), the field angle of an object for which focus detection is performed does not change depending on the insertion/removal of the lens unit L22 into/from the optical path even if the photographing field angle changes due to the insertion/removal of the lens unit L22.

When the F-number of the entire system changes depending on the insertion/removal of the lens unit L22 into/from the optical path, the focal depth also changes as the F-number changes.

Accordingly, the accuracy of focusing changes. This is because the focal depth changes with the change in the F-number of the image pickup optical system caused by the insertion/removal of the extender.

However, the focal depth of the branching optical system LA does not change, since it is branched by the branch element LD at a position on the object side of the lens unit L22.

For example, when an extender with which the focal length is doubled and the F-number is doubled is inserted into the optical path, the focal depth of the image pickup optical system is doubled, but the focal depth of the branching optical system does not change and is kept equal to that before the insertion of the extender.

This means that in the case of the auto focus system that seeks the best focus position (or the best image plane) using the branching optical system, the accuracy of focusing is enhanced by a factor of two when the extender is inserted.

In the embodiments, the branch element is disposed in the object side of the insertion/removal of the extender lens Ex into/from the optical path to guide light beams to the branching optical system LA used for focus detection.

Therefore, for example in the case where the "contrast detecting system" is used as the auto focusing system, it is not necessary to change the wobbling amount between before and after the insertion of the extender lens into the optical path.

If the branching point is on the image side of the extender lens, it is necessary to change the wobbling amount in accordance with the change in the F-number.

On the other hand, when the "phase difference system" is used, the auto focus region in the object does not differ between before and after the insertion of the extender lens into the optical path.

If the branching point is on the image side of the extender lens, the auto focus range in the branching optical system does not change though the field to be photographed changes. Therefore, the target region of the auto focusing changes between before and after the insertion of the extender.

FIG. 10 schematically shows the branch element LD and the branching optical system LA used in the embodiments. In FIG. 10, the line designated by x is the optical axis of the image pickup optical system and the line designated by y is the optical axis of the branching optical system LA, and reference sign S designates a reflection surface (a mirror, prism or the like) for branching or splitting light beams.

The branch element LD is disposed in such a way that its surface a and surface b are perpendicular to the optical axis x while its surface c is perpendicular to the optical axis y.

The reflection surface S splits the incident light beams into transmitted light beans and reflected light beams at a specific ratio. The reflection surface S is oriented with an appropriate angle relative to the optical axis x taking into consideration the direction in which the optical path is to be branched (i.e. axis y).

The ratio between the reflection and transmission through the reflection surface S is appropriately determined taking into consideration the light quantities required respectively in the image pickup optical system and the branching optical system LA.

The branch element LD may be a relatively thin flat plate having a reflection surface S that is arranged obliquely relative to the optical axis.

In the embodiments, the following conditions are satisfied:

$$\left| \frac{e_{22}}{e_{20} + e_{21}} \right| < 1.5 \quad (1)$$

$$\left| \frac{\phi_{21}}{\phi_w} \right| < 0.6 \quad (2)$$

where, $e_{20}$ represents the distance from the aperture stop to the position of the front side principal point of the aforementioned lens unit L21, $e_{21}$ represents the distance from position of the rear side principal point of the aforementioned lens unit L21 to the position of the front side principal point of the aforementioned lens unit L22, $e_{22}$ represents the distance from the position of the rear side principal point of the aforementioned lens unit L22 to the position of the front side principal point of the aforementioned lens unit L23, $\Phi_{21}$ represents the refractive power of the lens unit L21, and $\Phi_W$ represents the refractive power of the entire system of the zoom lens at the wide-angle end.

Conditions (1) and (2) are introduced in order to realize a zoom lens in which the imaging portion LR is small and light and the position of the exit pupil is far from the image plane and that has excellent optical performance with a simple lens configuration.

Condition (1) relates to the ratio of the distance $e_{22}$ from the position of the rear side principal point of lens unit L22 to the position of the front side principal point of lens unit L23 and the sum of the distance $e_{20}$ from the aperture stop SP to the position of the front side principal point of lens unit L21 and the distance $e_{21}$ from the position of the rear side principal point of lens unit L21 to the position of the front side principal point of lens unit L22.

When the ratio exceeds the upper limit of condition (1), the position of the exit pupil becomes close to the image plane, and significant shading occurs.

In addition, the refractive power and the effective diameter of lenses in lens unit L22 and lens unit L23 become large, and accordingly it is difficult to reduce the size and weight of the photographing system and to attain excellent optical performance with a simple lens configuration.

When the refractive power of the lens unit L21 becomes so large that the value defined in the left side of condition (2) becomes larger than the upper limit value of condition (2), the converted inclination angle of the axial marginal light beam upon incidence on the lens unit L22 becomes large. Consequently, decentering aberration and displacement of the optical axis on the image plane become highly sensitive to the decentering of the lens unit L22.

This can be a cause of displacement of the axis of the picked up image that occurs upon insertion or removal of the lens unit L22. To avoid this, a complex structure is needed, or difficult adjustment is required in the manufacturing process.

In addition, required refractive powers of lenses in the lens unit L22 and the lens unit L23 become high, and refractive powers of lenses in the extender lens unit Ex required to keep the ratio of change in the focal length attained by the extender lens unit Ex become high.

Therefore, it is difficult to achieve excellent optical performance with a simple lens configuration.

The macro shooting function and the flange back adjustment function may be assigned to the entire lens unit L23 or a part of the lens unit L23.

In the embodiments, the following condition is satisfied:

$$0.07 < |\Phi_{IS}/\Phi_W| < 0.22 \quad (3)$$

where $\Phi_{IS}$ is the refractive power of the anti-vibration lens unit IS and $\Phi_W$ is the refractive power of the entire system of the zoom lens at the wide-angle end.

If the absolute value of the refractive power $\Phi_{IS}$ of the anti-vibration lens unit IS is larger than the upper limit of condition (3), the decentering sensitivity to displacement of the axis of the anti-vibration lens unit for reducing image vibration becomes undesirably high, and it becomes difficult to mechanically control the position of the anti-vibration lens unit in directions perpendicular to the optical axis.

On the other hand, if the absolute value of the refractive power $\Phi_{IS}$ of the anti-vibration lens unit IS is smaller than the lower limit of the condition (3), the decentering sensitivity to displacement of the axis of the anti-vibration lens unit for reducing image vibration becomes undesirably low, and the drive amount in the directions perpendicular to the optical axis required for the anti-vibration lens unit becomes undesirably large. This is undesirable because it becomes difficult to reduce the size and weight of the lens and peripheral mechanisms.

More preferably, the numerical range of conditions (1) and (2) should be set as follows.

$$\left| \frac{e_{22}}{e_{20} + e_{21}} \right| < 1.0 \quad (1a)$$

$$\left| \frac{\phi_{21}}{\phi_w} \right| < 0.4 \quad (2a)$$

In the following numerical embodiments of the present invention will be presented.

In the numerical embodiments, the suffix number i (i=1, 2, 3 . . . ) represents the number of each surface counted from the object side, ri represents the radius of curvature of each surface, di represents the lens thickness or the lens gap between the i-th surface and the (i+1)-th surface, ni is the refractive index for the d-line and νi is the Abbe number for the d-line.

The two or three surfaces closest to the image side are surfaces of a glass material such as a face plate.

In numerical embodiment 1, a numerical embodiment of the extender lens Ex is also presented. In the numerical embodiments, f represents the focal length, Fno represents the F-number and ω represents the half field angle.

r40 and r41 in numerical embodiments 1 to 3 and r36 and r37 in numerical embodiment 4 correspond to the surfaces of the branch element LD.

(Numerical Embodiment 1)
f = 10.00-441.10   Fno = 1.8-3.1   2ω = 57.6°-1.4°

| | | | |
|---|---|---|---|
| r1 = 262.527 | d1 = 5.50 | n1 = 1.83932 | ν1 = 37.2 |
| r2 = 148.298 | d2 = 0.20 | | |
| r3 = 146.310 | d3 = 19.47 | n2 = 1.43496 | ν2 = 95.1 |
| r4 = 1711.919 | d4 = 11.35 | | |
| r5 = 446.535 | d5 = 12.04 | n3 = 1.43496 | ν3 = 95.1 |
| r6 = −528.168 | d6 = 0.07 | | |
| r7 = −522.929 | d7 = 5.00 | n4 = 1.77621 | ν4 = 49.6 |
| r8 = −7601.809 | d8 = 0.30 | | |
| r9 = 189.702 | d9 = 18.57 | n5 = 1.43496 | ν5 = 95.1 |
| r10 = −890.210 | d10 = 0.30 | | |
| r11 = 149.880 | d11 = 11.18 | n6 = 1.49845 | ν6 = 81.6 |
| r12 = 393.239 | d12 = variable | | |
| r13 = 521.146 | d13 = 2.00 | n7 = 1.77621 | ν7 = 49.6 |
| r14 = 53.105 | d14 = 4.73 | | |
| r15 = −148.563 | d15 = 1.80 | n8 = 1.77621 | ν8 = 49.6 |
| r16 = 51.373 | d16 = 6.72 | | |
| r17 = −66.261 | d17 = 1.80 | n9 = 1.79025 | ν9 = 50.0 |
| r18 = 47.388 | d18 = 7.80 | n10 = 1.93306 | ν10 = 21.3 |
| r19 = −366.607 | d19 = variable | | |
| r20 = 633.050 | d20 = 6.36 | n11 = 1.43985 | ν11 = 95.0 |
| r21 = −113.045 | d21 = 0.30 | | |
| r22 = 201.150 | d22 = 2.50 | n12 = 1.65223 | ν12 = 33.8 |
| r23 = 53.110 | d23 = 13.60 | n13 = 1.59143 | ν13 = 61.2 |
| r24 = −155.230 | d24 = 0.20 | | |
| r25 = 131.701 | d25 = 13.00 | n14 = 1.62032 | ν14 = 63.4 |
| r26 = −75.433 | d26 = 2.50 | n15 = 1.85501 | ν15 = 23.9 |
| r27 = −155.034 | d27 = 0.20 | | |
| r28 = 95.626 | d28 = 4.25 | n16 = 1.48915 | ν16 = 70.2 |
| r29 = 293.766 | d29 = variable | | |
| r30 = stop | d30 = 3.29 | | |
| r31 = −98.009 | d31 = 1.80 | n17 = 1.88814 | ν17 = 40.8 |
| r32 = 42.998 | d32 = 0.20 | | |
| r33 = 30.611 | d33 = 9.58 | n18 = 1.74618 | ν18 = 28.3 |
| r34 = −32.609 | d34 = 1.80 | n19 = 1.88814 | ν19 = 40.8 |
| r35 = 96.858 | d35 = 5.77 | | |
| r36 = −26.878 | d36 = 2.00 | n20 = 1.88815 | ν20 = 40.8 |
| r37 = −574.216 | d37 = 3.71 | | |
| r38 = −49.162 | d38 = 5.79 | n21 = 1.62409 | ν21 = 36.3 |
| r39 = −22.698 | d39 = 0.99 | | |
| r40 = ∞ | d40 = 33.46 | n22 = 1.83945 | ν22 = 42.7 |
| r41 = ∞ | d41 = 3.76 | | |
| r42 = −113.558 | d42 = 1.50 | n23 = 1.88815 | ν23 = 40.8 |
| r43 = 35.799 | d43 = 9.20 | n24 = 1.60718 | ν24 = 38.0 |
| r44 = −87.295 | d44 = 0.20 | | |
| r45 = 64.679 | d45 = 20.64 | n25 = 1.65222 | ν25 = 33.8 |
| r46 = −353.298 | d46 = 2.70 | | |
| r47 = 145.503 | d47 = 5.40 | n26 = 1.88815 | ν26 = 40.8 |
| r48 = 47.174 | d48 = 10.78 | n27 = 1.48915 | ν27 = 70.2 |
| r49 = −44.963 | d49 = 0.15 | | |
| r50 = 153.237 | d50 = 5.56 | n28 = 1.52033 | ν28 = 58.9 |
| r51 = −61.567 | d51 = 2.07 | n29 = 1.88815 | ν29 = 40.8 |
| r52 = 169.711 | d52 = 0.14 | | |
| r53 = 42.280 | d53 = 8.20 | n30 = 1.51825 | ν30 = 64.1 |
| r54 = −61.758 | d54 = 0.20 | | |
| r55 = 58.734 | d55 = 6.47 | n31 = 1.51825 | ν31 = 64.1 |
| r56 = −41.945 | d56 = 3.52 | n32 = 1.88815 | ν32 = 40.8 |

-continued
(Numerical Embodiment 1)
f = 10.00-441.10   Fno = 1.8-3.1   2ω = 57.6°-1.4°

| | | | |
|---|---|---|---|
| r57 = 82.493 | d57 = 5.00 | | |
| r58 = ∞ | d58 = 50.00 | n33 = 1.51825 | ν33 = 64.2 |
| r59 = ∞ | | | | focal length variable interval

| | 10.00 | 69.79 | 441.10 |
|---|---|---|---|
| d12 = | 2.40 | 92.40 | 121.40 |
| d19 = | 176.20 | 67.02 | 0.14 |
| d29 = | 3.30 | 22.48 | 60.36 |

| | | | |
|---|---|---|---|
| d41 = 0.65 | | | |
| r42 = 53.454 | d42 = 6.39 | n23 = 1.59143 | ν23 = 61.1 |
| r43 = −60.398 | d43 = 0.40 | | |
| r44 = 47.436 | d44 = 6.45 | n24 = 1.52033 | ν24 = 58.9 |
| r45 = −43.906 | d45 = 1.30 | n25 = 1.80642 | ν25 = 35.0 |
| r46 = 91.810 | d46 = 16.40 | | |
| r47 = −82.179 | d47 = 2.31 | n26 = 1.85504 | ν26 = 23.8 |
| r48 = −30.877 | d48 = 0.90 | n27 = 1.75844 | ν27 = 52.3 |
| r49 = 50.590 | d49 = 3.20 | | |

(extender lens EX)

(Numerical embodiment 2)
f = 10.000-441.1   Fno = 1.8-3.1   2ω = 57.6°-1.4°

| | | | |
|---|---|---|---|
| r1 = 262.527 | d1 = 5.50 | n1 = 1.83932 | ν1 = 37.2 |
| r2 = 148.298 | d2 = 0.20 | | |
| r3 = 146.310 | d3 = 19.47 | n2 = 1.43496 | ν2 = 95.1 |
| r4 = 1711.919 | d4 = 11.35 | | |
| r5 = 446.535 | d5 = 12.04 | n3 = 1.43496 | ν3 = 95.1 |
| r6 = −528.168 | d6 = 0.07 | | |
| r7 = −522.929 | d7 = 5.00 | n4 = 1.77621 | ν4 = 49.6 |
| r8 = −7601.809 | d8 = 0.30 | | |
| r9 = 189.702 | d9 = 18.57 | n5 = 1.43496 | ν5 = 95.1 |
| r10 = −890.210 | d10 = 0.30 | | |
| r11 = 149.880 | d11 = 11.18 | n6 = 1.49845 | ν6 = 81.6 |
| r12 = 393.239 | d12 = variable | | |
| r13 = 521.146 | d13 = 2.00 | n7 = 1.77621 | ν7 = 49.6 |
| r14 = 53.105 | d14 = 4.73 | | |
| r15 = −148.563 | d15 = 1.80 | n8 = 1.77621 | ν8 = 49.6 |
| r16 = 51.373 | d16 = 6.72 | | |
| r17 = −66.261 | d17 = 1.80 | n9 = 1.79025 | ν9 = 50.0 |
| r18 = 47.388 | d18 = 7.80 | n10 = 1.93306 | ν10 = 21.3 |
| r19 = −366.607 | d19 = variable | | |
| r20 = 633.050 | d20 = 6.36 | n11 = 1.43985 | ν11 = 95.0 |
| r21 = −113.045 | d21 = 0.30 | | |
| r22 = 201.150 | d22 = 2.50 | n12 = 1.65223 | ν12 = 33.8 |
| r23 = 53.110 | d23 = 13.60 | n13 = 1.59143 | ν13 = 61.2 |
| r24 = −155.230 | d24 = 0.20 | | |
| r25 = 131.701 | d25 = 13.00 | n14 = 1.62032 | ν14 = 63.4 |
| r26 = −75.433 | d26 = 2.50 | n15 = 1.85501 | ν15 = 23.9 |
| r27 = −155.034 | d27 = 0.20 | | |
| r28 = 95.626 | d28 = 4.25 | n16 = 1.48915 | ν16 = 70.2 |
| r29 = 293.766 | d29 = variable | | |
| r30 = stop | d30 = 3.29 | | |
| r31 = −98.009 | d31 = 1.80 | n17 = 1.88814 | ν17 = 40.8 |
| r32 = 42.998 | d32 = 0.20 | | |
| r33 = 30.611 | d33 = 9.58 | n18 = 1.74618 | ν18 = 28.3 |
| r34 = −32.609 | d34 = 1.80 | n19 = 1.88814 | ν19 = 40.8 |
| r35 = 96.858 | d35 = 5.29 | | |
| r36 = −39.088 | d36 = 2.00 | n20 = 1.88815 | ν20 = 40.8 |
| r37 = 289.579 | d37 = 4.94 | | |

(Numerical embodiment 2)
f = 10.000–441.1   Fno = 1.8–3.1   2ω = 57.6°–1.4°

| | | | |
|---|---|---|---|
| r38 = −23.835 | d38 = 2.71 | n21 = 1.62409 | ν21 = 36.3 |
| r39 = −20.743 | d39 = 1.00 | | |
| r40 = ∞ | d40 = 36.42 | n22 = 1.83945 | ν22 = 42.7 |
| r41 = ∞ | d41 = 2.50 | | |
| r42 = 138.494 | d42 = 1.50 | n23 = 1.88815 | ν23 = 40.8 |
| r43 = 33.658 | d43 = 6.99 | n24 = 1.62409 | ν24 = 36.3 |
| r44 = 269.185 | d44 = 0.20 | | |
| r45 = 54.227 | d45 = 24.11 | n25 = 1.65222 | ν25 = 33.8 |
| r46 = −354.319 | d46 = 3.20 | | |
| r47 = 109.971 | d47 = 10.58 | n26 = 1.48915 | ν26 = 70.2 |
| r48 = −58.881 | d48 = 0.15 | | |
| r49 = 307.172 | d49 = 9.03 | n27 = 1.52033 | ν27 = 58.9 |
| r50 = −29.695 | d50 = 1.30 | n28 = 1.88815 | ν28 = 40.8 |
| r51 = 87.427 | d51 = 0.30 | | |
| r52 = 64.571 | d52 = 9.68 | n29 = 1.51825 | ν29 = 64.1 |
| r53 = −35.823 | d53 = 0.20 | | |
| r54 = 38.605 | d54 = 7.72 | n30 = 1.48915 | ν30 = 70.2 |
| r55 = −45.602 | d55 = 3.04 | n31 = 1.88815 | ν31 = 40.8 |
| r56 = 121.089 | d56 = 5.00 | | |
| r57 = ∞ | d57 = 50.00 | n32 = 1.51825 | ν32 = 64.2 |
| r58 = ∞ | | | | focal length variable interval

| | 10.00 | 69.79 | 441.10 |
|---|---|---|---|
| d12 = | 2.40 | 92.40 | 121.40 |
| d19 = | 176.20 | 67.02 | 0.14 |
| d29 = | 3.30 | 22.48 | 60.36 |

(Numerical embodiment 3)
f = 10.000–441.1   Fno = 1.8–3.1   2ω = 57.6°–1.4°

| | | | |
|---|---|---|---|
| r1 = 262.527 | d1 = 5.50 | n1 = 1.83932 | ν1 = 37.2 |
| r2 = 148.298 | d2 = 0.20 | | |
| r3 = 146.310 | d3 = 19.47 | n2 = 1.43496 | ν2 = 95.1 |
| r4 = 1711.919 | d4 = 11.35 | | |
| r5 = 446.535 | d5 = 12.04 | n3 = 1.43496 | ν3 = 95.1 |
| r6 = −528.168 | d6 = 0.07 | | |
| r7 = −522.929 | d7 = 5.00 | n4 = 1.77621 | ν4 = 49.6 |
| r8 = −7601.809 | d8 = 0.30 | | |
| r9 = 189.702 | d9 = 18.57 | n5 = 1.43496 | ν5 = 95.1 |
| r10 = −890.210 | d10 = 0.30 | | |
| r11 = 149.880 | d11 = 11.18 | n6 = 1.49845 | ν6 = 81.6 |
| r12 = 393.239 | d12 = variable | | |
| r13 = 521.146 | d13 = 2.00 | n7 = 1.77621 | ν7 = 49.6 |
| r14 = 53.105 | d14 = 4.73 | | |
| r15 = −148.563 | d15 = 1.80 | n8 = 1.77621 | ν8 = 49.6 |
| r16 = 51.373 | d16 = 6.72 | | |
| r17 = −66.261 | d17 = 1.80 | n9 = 1.79025 | ν9 = 50.0 |
| r18 = 47.388 | d18 = 7.80 | n10 = 1.93306 | ν10 = 21.3 |
| r19 = −366.607 | d19 = variable | | |
| r20 = 633.050 | d20 = 6.36 | n11 = 1.43985 | ν11 = 95.0 |
| r21 = −113.045 | d21 = 0.30 | | |
| r22 = 201.150 | d22 = 2.50 | n12 = 1.65223 | ν12 = 33.8 |
| r23 = 53.110 | d23 = 13.60 | n13 = 1.59143 | ν13 = 61.2 |
| r24 = −155.230 | d24 = 0.20 | | |
| r25 = 131.701 | d25 = 13.00 | n14 = 1.62032 | ν14 = 63.4 |
| r26 = −75.433 | d26 = 2.50 | n15 = 1.85501 | ν15 = 23.9 |
| r27 = −155.034 | d27 = 0.20 | | |
| r28 = 95.626 | d28 = 4.25 | n16 = 1.48915 | ν16 = 70.2 |
| r29 = 293.766 | d29 = variable | | |
| r30 = stop | d30 = 3.29 | | |
| r31 = −98.009 | d31 = 1.80 | n17 = 1.88814 | ν17 = 40.8 |
| r32 = 42.998 | d32 = 0.20 | | |
| r33 = 30.611 | d33 = 9.58 | n18 = 1.74618 | ν18 = 28.3 |
| r34 = −32.609 | d34 = 1.80 | n19 = 1.88814 | ν19 = 40.8 |

(Numerical embodiment 3)
f = 10.000–441.1   Fno = 1.8–3.1   2ω = 57.6°–1.4°

| | | | |
|---|---|---|---|
| r35 = 96.858 | d35 = 6.25 | | |
| r36 = −27.332 | d36 = 2.00 | n20 = 1.88815 | ν20 = 40.8 |
| r37 = −712.507 | d37 = 1.75 | | |
| r38 = −84.473 | d38 = 5.37 | n21 = 1.62409 | ν21 = 36.3 |
| r39 = −23.310 | d39 = 1.00 | | |
| r40 = ∞ | d40 = 30.00 | n22 = 1.83945 | ν22 = 42.7 |
| r41 = ∞ | d41 = 2.80 | | |
| r42 = −367.543 | d42 = 1.50 | n23 = 1.88815 | ν23 = 40.8 |
| r43 = 90.041 | d43 = 6.63 | n24 = 1.62409 | ν24 = 36.3 |
| r44 = 451.316 | d44 = 0.22 | | |
| r45 = 115.987 | d45 = 24.15 | n25 = 1.65222 | ν25 = 33.8 |
| r46 = −222.086 | d46 = 5.77 | | |
| r47 = −169.041 | d47 = 12.14 | n26 = 1.48915 | ν26 = 70.2 |
| r48 = −36.461 | d48 = 0.15 | | |
| r49 = −71.551 | d49 = 5.79 | n27 = 1.52033 | ν27 = 58.9 |
| r50 = −25.706 | d50 = 1.30 | n28 = 1.88815 | ν28 = 40.8 |
| r51 = −119.534 | d51 = 0.15 | | |
| r52 = 60.617 | d52 = 8.17 | n29 = 1.51825 | ν29 = 64.1 |
| r53 = −48.565 | d53 = 0.67 | | |
| r54 = 62.069 | d54 = 8.36 | n30 = 1.48915 | ν30 = 70.2 |
| r55 = −41.319 | d55 = 2.69 | n31 = 1.88815 | ν31 = 40.8 |
| r56 = −311.087 | d56 = 5.00 | | |
| r57 = ∞ | d57 = 50.00 | n32 = 1.51825 | ν32 = 64.2 |
| r58 = ∞ | | | | focal length variable interval

| | 10.00 | 69.79 | 441.10 |
|---|---|---|---|
| d12 = | 2.40 | 92.40 | 121.40 |
| d19 = | 176.20 | 67.02 | 0.14 |
| d29 = | 3.30 | 22.48 | 60.36 |

(Numerical embodiment 4)
f = 8.500–127.5   Fno = 1.7–2.0   2ω = 65.8°–4.9°

| | | | |
|---|---|---|---|
| r1 = −251.088 | d1 = 2.00 | n1 = 1.81265 | ν1 = 25.4 |
| r2 = 157.249 | d2 = 7.22 | | |
| r3 = 234.983 | d3 = 10.06 | n2 = 1.43985 | ν2 = 95.0 |
| r4 = −158.211 | d4 = 7.14 | | |
| r5 = 162.538 | d5 = 8.51 | n3 = 1.49845 | ν3 = 81.5 |
| r6 = −316.010 | d6 = 0.20 | | |
| r7 = 108.347 | d7 = 7.30 | n4 = 1.62287 | ν4 = 60.3 |
| r8 = 2254.334 | d8 = 0.20 | | |
| r9 = 61.427 | d9 = 6.65 | n5 = 1.62287 | ν5 = 60.3 |
| r10 = 128.524 | d10 = variable | | |
| r11 = 78.912 | d11 = 0.80 | n6 = 1.83945 | ν6 = 42.7 |
| r12 = 15.768 | d12 = 7.79 | | |
| r13 = −41.835 | d13 = 0.80 | n7 = 1.77621 | ν7 = 49.6 |
| r14 = 60.569 | d14 = 1.99 | | |
| r15 = 33.469 | d15 = 5.33 | n8 = 1.85501 | ν8 = 23.9 |
| r16 = −41.646 | d16 = 1.17 | | |
| r17 = −28.573 | d17 = 0.80 | n9 = 1.77621 | ν9 = 49.6 |
| r18 = 133.163 | d18 = variable | | |
| r19 = −27.765 | d19 = 0.80 | n10 = 1.77621 | ν10 = 49.6 |
| r20 = 41.769 | d20 = 2.81 | n11 = 1.85501 | ν11 = 23.9 |
| r21 = −859.593 | d21 = variable | | |
| r22 = stop | d22 = 1.00 | | |
| r23 = ∞ | d23 = 4.77 | n12 = 1.51977 | ν12 = 52.4 |
| r24 = −29.997 | d24 = 0.10 | | |
| r25 = 10119.580 | d25 = 3.06 | n13 = 1.58482 | ν13 = 40.8 |
| r26 = −55.852 | d26 = 0.10 | | |
| r27 = 222.578 | d27 = 6.34 | n14 = 1.48915 | ν14 = 70.2 |
| r28 = −25.903 | d28 = 1.10 | n15 = 1.80642 | ν15 = 35.0 |
| r29 = 572.440 | d29 = 0.10 | | |
| r30 = 44.407 | d30 = 4.49 | n16 = 1.62033 | ν16 = 63.3 |
| r31 = −111.118 | d31 = 3.30 | | |

-continued (Numerical embodiment 4)
f = 8.500-127.5    Fno = 1.7-2.0    2ω = 65.8°-4.9°

| | | | |
|---|---|---|---|
| r32 = −145.684 | d32 = 1.10 | n17 = 1.88815 | ν17 = 40.8 |
| r33 = 54.946 | d33 = 0.20 | | |
| r34 = 43.066 | d34 = 3.26 | n18 = 1.81643 | ν18 = 22.8 |
| r35 = 106.473 | d35 = 2.94 | | |
| r36 = ∞ | d36 = 30.00 | n19 = 1.83945 | ν19 = 42.7 |
| r37 = ∞ | d37 = 2.61 | | |
| r38 = −90.109 | d38 = 1.50 | n20 = 1.88815 | ν20 = 40.8 |
| r39 = 56.292 | d39 = 15.26 | n21 = 1.58482 | ν21 = 40.8 |
| r40 = −44.395 | d40 = 0.19 | | |
| r41 = −136.321 | d41 = 11.60 | n22 = 1.70442 | ν22 = 30.1 |
| r42 = −124.068 | d42 = 1.40 | | |
| r43 = 36.983 | d43 = 3.33 | n23 = 1.88815 | ν23 = 40.8 |
| r44 = 24.527 | d44 = 8.26 | n24 = 1.48915 | ν24 = 70.2 |
| r45 = −131.955 | d45 = 0.20 | | |
| r46 = 45.779 | d46 = 6.77 | n25 = 1.48915 | ν25 = 70.2 |
| r47 = −43.729 | d47 = 1.20 | n26 = 1.88815 | ν26 = 40.8 |
| r48 = 49.827 | d48 = 0.19 | | |
| r49 = 32.761 | d49 = 6.19 | n27 = 1.48915 | ν27 = 70.2 |
| r50 = −61.542 | d50 = 4.69 | | |
| r51 = ∞ | d51 = 30.00 | n28 = 1.60718 | ν28 = 38.0 |
| r52 = ∞ | d52 = 16.20 | n29 = 1.51825 | ν29 = 64.2 |
| r53 = ∞ | | | |

| focal length variable interval | | | |
|---|---|---|---|
| | 8.50 | 51.00 | 127.50 |
| d10 = | 1.32 | 41.58 | 50.12 |
| d18 = | 51.65 | 7.31 | 5.67 |
| d21 = | 4.50 | 8.58 | 1.68 |

| | $\Phi_w$ | $\Phi_{21}$ | $e_{20}$ (mm) | $e_{21}$ (mm) | $e_{22}$ (mm) | Exit pupil position (mm) |
|---|---|---|---|---|---|---|
| numeral embodiment 1 | 0.10 | −0.027 | 4.6 | 76.8 | −6.6 | 102.0 |
| numeral embodiment 2 | 0.10 | −0.039 | 9.7 | 46.5 | 20.1 | 101.9 |
| numeral embodiment 3 | 0.10 | −0.024 | 4.4 | 80.2 | 1.7 | 69.1 |
| numeral embodiment 4 | 0.12 | 0.027 | 2.0 | 270.5 | −255.5 | 101.8 |

| | condition 1 $|e_{22}/(e_{20}+e_{21})|$ | condition 2 $|\Phi_{21}/\Phi_w|$ |
|---|---|---|
| numeral embodiment 1 | 0.08 | 0.27 |
| numeral embodiment 2 | 0.36 | 0.39 |
| numeral embodiment 3 | 0.02 | 0.24 |
| numeral embodiment 4 | 0.94 | 0.23 |

| | condition 3 | |
|---|---|---|
| | $\Phi_{1S}$ | $|\Phi_{1S}/\Phi_w|$ |
| numeral embodiment 1 | −0.019 | 0.19 |
| numeral embodiment 2 | −0.019 | 0.19 |
| numeral embodiment 3 | −0.019 | 0.19 |
| numeral embodiment 4 | −0.011 | 0.09 |

Numerical embodiment 1 is characterized in that the principal point interval $e_{22}$ is negative. When condition (1) is satisfied, the position for the exit pupil can be secured.

In numerical embodiment 1, when the extender lens Ex is inserted instead of the lens unit L22, the focal length range becomes 20.00 to 882.4.

Numerical embodiment 2 is characterized in that the value $|\Phi_{21}/\Phi_w|$ close to the limit value defined in condition (2). If refractive power $\Phi_{21}$ becomes so large as to deviate the range defined by condition (2), the converted inclination angle of the axial marginal light beam upon incidence on the lens unit L22 becomes large.

Consequently, the decentering aberration and displacement of the optical axis on the image plane become undesirably highly sensitive to the decentering of the lens unit L22.

This can be a cause of deterioration of picked up images that occurs upon exchange of the lens unit L22 with the extender lens unit Ex. To avoid this, a complex structure is needed, or difficult adjustment is required in the manufacturing process.

For example, when the lens unit L22 is translationally decentered by 0.1 mm, the displacement of the optical axis on the image plane is 0.33 mm in numerical embodiment 1.

On the other hand, in numerical embodiment 2 in which the value $|\Phi_{21}/\Phi_w|$ is close to the limit value defined in condition (2), the displacement of the optical axis is 0.070 mm. Therefore, it is necessary to control the position of the optical axis of the lens unit L22 that is inserted/removed more precisely in numerical embodiment 2 than in numerical embodiment 1.

Numerical embodiment 3 is characterized in that the value defined in the left side of condition (1) is close to zero. When condition (1) is satisfied, the position for the exit pupil can be secured.

Numerical embodiment 4 is characterized in that the value defined in the left side of condition (1) is close to the upper limit of condition (1) and that the lens unit L21 has a positive refractive power.

If the condition (1) is not satisfied, the refractive powers of the lenses in the lens unit L22 and the lens unit L23 become too large or the position of the exit pupil becomes too close to the imaging position to keep excellent optical performance.

In the case where conditions (1) and (2) are satisfied under the normal state in which the lens unit L22 is inserted, the position for the exit pupil can be secured sufficiently without a problem when the extender lens unit Ex is inserted.

For example in numerical embodiment 1, the position of the exit pupil in the normal state in which the lens unit L22 is inserted is +102 mm from the image plane, and the position of the exit pupil in the state in which the extender lens unit Ex is inserted is −198 mm from the image plane.

In numerical embodiments 1 to 4, macro shooting is enabled and flange back adjustment is performed by driving the entire lens unit L23 along the optical axis direction.

In numerical embodiments 1 to 4, a part of the lenses in the lens unit L21 is driven in directions perpendicular to the optical axis to reduce vibration.

In numerical embodiments 1, 2 and 3, the first to third lenses counted from the object side in the lens unit L21 constitute the anti-vibration lens unit IS. In numerical embodiment 4, the sixth and seventh lenses counted from the object side in the lens unit L21 constitute the anti-vibration lens unit IS. The anti-vibration lens unit LS is driven in a plane perpendicular to the optical axis to reduce vibration.

In connection with this, numerical embodiments 1 to 4 satisfy condition (3) and have excellent anti-vibration performance accordingly. Although the refractive power $\Phi_{IS}$ of the anti-vibration lens unit IS in numerical embodiments 1 to 4 is negative, it may have a positive value.

For example, the sensitivity to the displacement of the axis of the anti-vibration lens unit IS in the numerical embodiments 1 to 3 is 1:0.85. The sensitivity to the displacement of the axis of the anti-vibration lens unit IS in the numerical embodiment 4 is 1:0.50.

As per the above, the above-described embodiments realize small and light zoom lenses having excellent optical performance that have a branch element for branching a part of the light beams from the image pickup optical system for the purpose of auto focusing (auto focus detection) and in which the exit pupil position is kept sufficiently away from the image plane so that shading is unlikely to occur.

FIG. 11 schematically shows the relevant portion of a photographing system (or television camera system) according to a fifth embodiment in which a zoom lens according to any one of the above described embodiments is used as an image pickup optical system.

In FIG. 11, what is designated by reference numeral 101 is a zoom lens according to any one of the first to fourth embodiments. What is designated by reference numeral 124 is a camera as an image pickup apparatus.

The zoom lens 101 is detachably mounted on the camera 124.

Reference numeral 125 designates the image pickup system constituted by the camera 124 and the zoom lens 101 mounted thereon.

The zoom lens 101 includes a focusing portion LF, a zoom portion LZ and an imaging portion LR.

The focusing portion LF includes a focusing lens unit L11. The zoom portion LZ includes a variator lens unit L12 that moves along the optical axis to vary magnification of the zoom lens and a compensator lens unit L13 that moves along the optical axis to compensate image plane variation upon zooming.

Reference sign SP designates an aperture stop for regulating the light quantity.

The imaging portion LR, which is a relay lens unit that is kept stationary during zooming, includes a lens unit L21 including an anti-vibration lens unit IS for reducing image vibration and a branch element LD for branching a part of the light beams for image pickup into a branching optical system LA, a lens unit L22 that can be inserted into/removed from the optical path and a lens unit L23.

An extender lens unit Ex is a lens unit that is to be interchanged with the lens unit L22 to change the focal length range of the entire zoom lens 101.

The branching optical system LA is a lens unit that detects the best focus position using the light beams branched by the branch element LD.

Reference numeral 113 designates a light receiving element (photo electric transducer), such as a CCD sensor or a CMOS sensor, that receives an image formed by the branching optical system LA.

Reference numerals 114 and 115 designate drive mechanisms such as a helicoid and a cam etc. for driving the focusing portion LF and the zoom portion LZ respectively along the optical axis.

The drive mechanisms 114, 115 can be operated electrically by a drive unit 123. The drive mechanisms 114, 115 can also be operated manually.

Reference numerals 116 to 118 designate motors (drive means) that electrically drive the drive mechanisms 114, 115, and the light quantity regulating stop SP.

Reference numerals 119 to 121 designate detectors such as an encoder, a potentiometer and a photosensor for detecting the position of the focusing portion LF and the zoom portion LZ on the optical axis and the diameter of the aperture of the light quantity regulating stop SP.

Reference numeral 126 designates a switching member used for switching between auto focus and manual focus and switching between a mode under which auto focusing is performed at all times and a mode in which auto focusing is performed only when ordered through a member annexed to the switching member 126.

In addition, a designation member (not shown) used for designating an object in the field for which auto focusing is to be performed is provided.

In the camera 124, reference numeral 109 designates a glass block including an optical filter and a color splitting prism in the camera 124. Reference numeral 110 designates an image pickup element (photo electric transducer) such as a CCD sensor or a CMOS sensor that receives an object image formed by the zoom lens 101.

Reference numerals 111 and 122 designate CPUs that control various operations of the camera 124 and the zoom lens 101 respectively.

In the auto focusing process in this image pickup system 125, auto focusing for an object to be focused on is firstly instructed through the switching member 126.

Light beams branched by the branch element LD in the zoom lens 101 are guided to the light receiving element 113 through the branching optical system LA.

The focus state on the surface of the image pickup element 110 is computed by the CPU 122 from a signal obtained through the light receiving element 113 while making use of zooming, focusing and stop position information obtained by the detectors 119 to 121 when necessary.

The focusing lens unit L11 is driven by the motor 116 to the best position to achieve focus.

The above described auto focus operation may be performed only when auto focusing is ordered through the designation member 126, or alternatively, the auto focusing operation may be performed at all times.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-263888, filed Sep. 12, 2005 which is hereby incorporated by reference herein in its entirety.

What is claimed is:

1. A zoom lens comprising the following elements arranged in the mentioned order from an object side to an image side:

a focusing lens unit;

a variator lens unit that moves along an optical axis during zooming;

a compensator lens unit that moves along the optical axis to compensate image plane variation during zooming;

an aperture stop for regulating light quantity; and a relay lens unit that is kept stationary during zooming, wherein the relay lens unit includes a lens unit L21 including a branch element, a lens unit L22 that is interchangeable with an extender lens unit L22ex that can be inserted into or removed from the optical path to change focal length range of the entire lens system and a lens unit L23 having a positive refractive power, arranged in the mentioned order from the object side to the image side, and wherein the zoom lens satisfies the following conditions:

$$\left| \frac{e_{22}}{e_{20} + e_{21}} \right| < 1.5$$

$$\left| \frac{\phi_{21}}{\phi_w} \right| < 0.6$$

where $e_{20}$ represents a distance from the aperture stop to a position of a front side principal point of the lens unit L21, $e_{21}$ represents a distance from a position of a rear side principal point of the lens unit L21 to a position of a front side principal point of the lens unit L22, $e_{22}$ represents a distance from a position of a rear side principal point of the lens unit L22 to a position of a front side principal point of the lens unit L23, $\Phi_{21}$ represents a refractive power of the lens unit L21, and $\Phi_W$ represents a refractive power of the entire system of the zoom lens at the wide-angle end.

2. A zoom lens according to claim 1, satisfying the following condition:

$$\left| \frac{e_{22}}{e_{20} + e_{21}} \right| < 1.0$$

$$\left| \frac{\phi_{21}}{\phi_w} \right| < 0.4.$$

3. A zoom lens according to claim 1, wherein said lens unit L21 includes an anti-vibration lens unit IS that is movable in a plane perpendicular to the optical axis.

4. A zoom lens according to claim 1, wherein a lens unit constituting said lens unit L23 has at least one of a macro shooting function and a flange back adjusting function.

5. A zoom lens according to claim 4, wherein said lens unit L21 includes an anti-vibration lens unit that is movable in a plane perpendicular to the optical axis.

6. A zoom lens according to claim 1, satisfying the following condition:

$$0.07 < |\Phi_{IS}/\Phi_W| < 0.22$$

where $\Phi_{IS}$ is a refractive power of said anti-vibration lens unit IS and $\Phi_W$ is a refractive power of the entire system of the zoom lens at the wide-angle end.

7. An image pickup apparatus, comprising:

a zoom lens according to claim 1;

and a solid state image pickup element that receives an image formed by the zoom lens.

* * * * *